United States Patent [19]

Chau et al.

[11] Patent Number: 5,116,532
[45] Date of Patent: May 26, 1992

[54] METHOD OF MAKING LANTHANUM CERIUM TERBIUM PHOSPHATE PHOSPHOR

[75] Inventors: Chung N. Chau, Sayre; Anthony F. Kasenga; Charles F. Chenot, both of Towanda, all of Pa.; Leslie F. Gray, Waverly, N.Y.

[73] Assignee: GTE Products Corporation, Stamford, Conn.

[21] Appl. No.: 522,695

[22] Filed: May 14, 1990

[51] Int. Cl.$^5$ .............................................. C09K 11/81
[52] U.S. Cl. ................................................ 252/301.4 P
[58] Field of Search ................................... 252/301.4 P

[56] References Cited

U.S. PATENT DOCUMENTS 3,544,483 12/1970 Lagos ........................... 252/301.4 P
4,127,415 11/1978 Quackenbush et al. ....... 252/301.4 P
4,423,349 12/1983 Nakajima et al. .................... 313/487

FOREIGN PATENT DOCUMENTS 2534834 2/1976 Fed. Rep. of Germany ... 252/301.4 P
54-56086 5/1979 Japan ............................ 252/301.4 P
57-133182 8/1982 Japan ............................ 252/301.4 P
59-179578 10/1984 Japan ............................ 252/301.4 P
2124243 2/1984 United Kingdom ......... 252/301.4 P Primary Examiner—Jack Cooper
Attorney, Agent, or Firm—Elizabeth A. Levy

[57] ABSTRACT

A method of making a lanthanum cerium terbium phosphate phosphor involves the single-step reaction of a single-phase, mixed valence state lanthanum cerium terbium oxide and boron phosphate. Alternatively, the single-step reaction may involve a mixture of lanthanum oxide, cerium oxide, terbium oxide and boron phosphate.

21 Claims, No Drawings

METHOD OF MAKING LANTHANUM CERIUM TERBIUM PHOSPHATE PHOSPHOR

TECHNICAL FIELD

This invention relates to a process for making a lanthanum cerium terbium phosphate phosphor for use in fluorescent lamps.

BACKGROUND ART

U.S. Pat. No. 4,423,349 to Nakajima et al discloses two methods of making this phosphor. In one method, carbonates of lanthanum, cerium and terbium are formed at 70° C., which are then reacted with phosphoric acid at 75° C. to form a lanthanum cerium terbium phosphate. The phosphate is then fired at 1150° C. for 75 minutes to form the phosphor.

In another method, a coprecipitate of lanthanum cerium terbium oxalate is formed at 80° C. and decomposed at 800° C. to form a single-phase, mixed valence state lanthanum cerium terbium oxide. Diammonium phosphate is added to the oxide, and the mixture is then decomposed at 700° C. to form a lanthanum cerium terbium phosphate. The phosphate is then crushed and fired at 1200° C. for 4 hours to form the phosphor. Boron oxide or ammonium borate as a fluxing agent may be added before the firing step to promote the reaction and improve brightness.

SUMMARY OF THE INVENTION

The prior art methods require either a multiple-step synthesis of rare earth compounds before the firing step, or a multiple-step firing. Such additional manufacturing steps are inefficient and costly. Furthermore, because of the volatility of the phosphate sources used, a great excess of the phosphate compound is required in the reaction between the rare earth compounds and the phosphate to form the phosphor.

The present invention obviates these disadvantages by providing a method of synthesizing the phosphor in a single step. This is accomplished by the use of boron phosphate as the phosphate source. The stability of boron phosphate at elevated temperatures allows it to be used in near stoichiometric proportions without the excessive phosphate losses that occur when more volatile phosphate sources are used.

It is an object of the invention to provide a more efficient method of making lanthanum cerium terbium phosphate phosphor.

In accordance with the invention there is provided a method of making lanthanum cerium terbium phosphate phosphor comprising the steps of reacting single-phase, mixed valence state lanthanum cerium terbium oxide with boron phosphate at a suitable temperature to form a mixture comprising lanthanum cerium terbium phosphate phosphor and boron oxide, and separating the phosphor from the boron oxide.

BEST MODE FOR CARRYING OUT THE INVENTION

For a better understanding of the present invention, together with other and further objects, advantages and capabilities thereof, reference is made to the following disclosure and appended claims.

The method of the present invention is a single-step synthesis whereby rare earth compounds are reacted with boron phosphate ($BPO_4$). Optionally, an effective amount of a flux-forming compound, for example, lithium carbonate ($Li_2CO_3$), may be reacted with the rare earth compounds and boron phosphate.

The rare earth raw materials may be a single-phase material of lanthanum cerium terbium oxide having the composition $(La_xCe_yTb_z)_2O_3$ where $x=0.39$ to $0.73$ and preferably from $0.42$ to $0.70$; $y=0.17$ to $0.45$ and preferably from $0.18$ to $0.44$; and $z=0.10$ to $0.16$ and preferably from $0.12$ to $0.14$. A preferred lanthanum cerium terbium oxide has the composition $(La_{0.446}Ce_{0.424}Tb_{0.130})_2O_3$ and is commercially available from Rhone-Poulenc, Inc. or Shin-Etsu Chemical Co., Ltd. Alternatively, the individual oxides of lanthanum, cerium and terbium may be used. Boron phosphate, while commercially available, may not be of sufficient purity to obtain the results desired in this invention. It has been found that boron phosphate of a sufficiently high purity may be prepared by heating a 1:1 mixture of boric acid ($H_3BO_3$) and diammonium phosphate (($NH_4)_2HPO_4$) at 700° C. to 1000° C. for 2 hours.

The reaction between boron phosphate and the rare earth oxide begins at about 750° C. to 800° C. However, the desired ionic equilibrium between cerium and terbium ion pairs does not occur until a temperature of about 1150° C. to 1300° C. is reached. Similarly, growth of phosphor crystals does not begin at the initial reaction temperature but instead occurs in the preferred temperature range of 1150° C. to 1300° C. A reacting time of about 1.5 to about 4 hours at this temperature range is desired.

Boron phosphate, although formed from the reaction of two low melting-point oxides, is an extremely stable compound with a melting point in excess of 1600° C. When boron phosphate is used as the phosphate source in the present invention, near stoichiometric proportions of the rare earth compounds and boron phosphate can be used. Because of its high melting point, boron phosphate does not evaporate or decompose before the preferred phosphor reaction temperature is reached. The rare earth compounds, such as lanthanum cerium terbium oxide or the individual oxides of lanthanum, cerium and terbium, may be combined with the boron phosphate in near stoichiometric proportions. A preferred molar ratio of the rare earth compound or compounds to the boron phosphate is from about 1:1 to about 1:1.05.

Prior art phosphate source such as diammonium phosphate decompose, melt or evaporate below 1150° C. Therefore, substantially excessive amounts of the phosphate source must be provided, and/or multiple firing steps must be employed to secure a sufficient amount of the phosphate for reaction with the rare earth compounds to form the phosphor.

During the firing step as per this invention boron phosphate reacts with lanthanum cerium terbium oxide to form a lanthanum cerium terbium phosphate phosphor in a boron oxide ($B_2O_3$) solution. Boron oxide acts as a mild fluxing medium to promote the reaction by facilitating crystal growth.

An advantage of using boron phosphate as the phosphate source in this reaction is its capacity as a reducing agent. Cerium and terbium are present in lanthanum cerium terbium oxide as $+4$ valence ions. These $+4$ ions are reduced to the $+3$ valence state in the presence of boron phosphate. Prior art methods for making this phosphor require a reducing atmosphere to effect this valence state reduction. The reaction as per this invention can occur in an inert atmosphere because of the reducing properties of boron phosphate. A reducing atmosphere can also be used.

It is believed that the solubility of rare earth phosphate compounds in boron oxide is improved by the addition of a small amount of a flux-forming compound, such as lithium carbonate, to the solution. The combination of lithium oxide and boron oxide appears to have improved fluxing capabilities over the boron oxide alone.

After firing, the phosphor is washed in basic and acidic solutions to remove any residual boron and lithium compound impurities.

The following non-limiting examples are presented.

EXAMPLE 1

The following raw materials were combined in a 10-qt plastic V-blender: 1660 grams of lanthanum cerium terbium oxide having the composition $(La_{0.446}Ce_{0.424}Tb_{0.130})_2O_3$; 1110 grams of boron phosphate, $BPO_4$; and 22.2 grams lithium carbonate, $Li_2CO_3$. The molar ratios of the components were thus 1 mole of rare earth oxide, 1.05 moles of boron phosphate and 0.03 mole of lithium carbonate (0.06 mole of lithium ions). The raw materials were V-blended for 15 minutes and then blended for 15 minutes with an intensifying bar to form a uniform mixture. The mixture was then fired at 1200° C. for 4 hours in a 1% hydrogen/99% nitrogen atmosphere to form the phosphor. The reaction is indicated by the following equation:

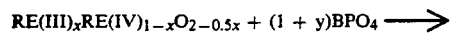
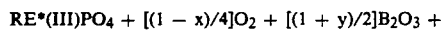
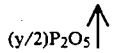

where
RE(III) is $La^{+3}$ or $Tb^{+3}$ or $Ce^{+3}$;
RE(IV) is $Ce^{+4}$ or $Tb^{+4}$;
RE*(III) is (lanthanum cerium terbium)$^{+3}$;
$0.47 \leq x \leq 1.0$; and
$0 < y \leq 0.05$.

The fired cake was broken up and washed at about 90° C. for about 4 hours in 2% dilute nitric acid, $HNO_3$. After filtration, the white body phosphor was washed and filtered three times with hot deionized water. The washed phosphor was then washed with 5% ammonium hydroxide, $NH_4OH$. After this base wash the phosphor was filtered and washed with hot deionized water. The filtered phosphor was dried at about 110° C. for about 16 hours and then sifted through a 378 nylon mesh screen.

EXAMPLE 2

The following raw materials were combined in a 10-qt plastic V-blender: 733.1 grams lanthanum oxide, $La_2O_3$; 243.0 grams terbium oxide, $Tb_4O_7$; 740.1 grams cerium oxide, $CeO_2$; 1110 grams boron phosphate, $BPO_4$; and 22.2 grams lithium carbonate, $Li_2CO_3$. The molar ratios of the components were thus 0.450 mole of lanthanum ions, 0.130 mole of terbium ions, 0.43 mole of cerium ions, 1.05 moles of boron phosphate and 0.03 mole of lithium carbonate (0.06 mole of lithium ions). The blending, firing and washing conditions were the same as those of Example 1. The reaction is indicated by the following equation:

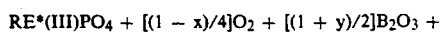
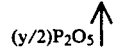

where
RE(III) is $La^{+3}$ or $Tb^{+3}$ or $Ce^{+3}$;
RE(IV) is $Ce^{+4}$ or $Tb^{+4}$;
RE*(III) is (lanthanum cerium terbium)$^{+3}$;
$0.47 \leq x \leq 1.0$; and
$0 < y \leq 0.05$.

While there has been shown and described what are at present considered the preferred embodiments of the invention, it will be obvious to those skilled in the art that various changes and modification may be made therein without departing from the scope of the invention as defined by the appended claims.

What is claimed is:

1. A method of making lanthanum cerium terbium phosphate phosphor, comprising the steps of:
    a) reacting single-phase lanthanum cerium terbium oxide with boron phosphate at about 1150° C. to about 1300° C. in an inert or reducing atmosphere to form a mixture comprising lanthanum cerium terbium phosphate phosphor and boron oxide; and
    b) separating said lanthanum cerium terbium phosphate phosphor from said boron oxide.

2. The method of claim 1 wherein said lanthanum cerium terbium oxide and said boron phosphate are provided in near stoichiometric proportions.

3. The method of claim 2 wherein said lanthanum cerium terbium oxide and said boron phosphate are provided in a molar ratio of from about 1:1 to about 1:1.05.

4. The method of claim 1 wherein said reaction step occurs for about 1.5 to about 4 hours.

5. The method of claim 4 wherein said reaction step occurs at about 1200° C. for about 4 hours.

6. The method of claim 4 wherein said reaction step occurs in an inert atmosphere.

7. The method of claim 4 wherein said reaction step occurs in a reducing atmosphere.

8. The method of claim 1 wherein said separation step is performed by washing.

9. The method of claim 8 wherein said washing is performed in acidic and basic solutions.

10. The method of claim 9 wherein said acidic solution is dilute nitric acid.

11. The method of claim 9 wherein said basic solution is dilute ammonium hydroxide.

12. A method of making lanthanum cerium terbium phosphate phosphor, comprising the steps of:
    a) reacting lanthanum oxide, cerium oxide, and terbium oxide with boron phosphate at about 1150° C. to about 1300° C. in an inert or reducing atmosphere to form a mixture comprising lanthanum cerium terbium phosphate phosphor and boron oxide; and
    b) separating said lanthanum cerium terbium phosphate phosphor from said boron oxide.

13. The method of claim 12 wherein said lanthanum oxide, said cerium oxide, said terbium oxide and said boron phosphate are provided in near stoichiometric proportions.

14. The method of claim 12 wherein said reaction step occurs for about 1.5 to about 4 hours.

15. The method of claim 14 wherein said reaction step occurs at about 1200° C. for about 4 hours.

16. The method of claim 14 wherein said reaction step occurs in an inert atmosphere.

17. The method of claim 14 wherein said reaction step occurs in a reducing atmosphere.

18. The method of claim 12 wherein said separation step is performed by washing.

19. The method of claim 18 wherein said washing is performed in acidic and basic solutions.

20. The method of claim 19 wherein said acidic solution is dilute nitric acid.

21. The method of claim 19 wherein said basic solution is dilute ammonium hydroxide.

* * * * *